MODULATION SYSTEM FOR CONVERTING ANALOGUE SIGNALS TO A PULSE AMPLITUDE TO PULSE WIDTH TO A BINARY OUTPUT

Filed Oct. 22, 1965 3 Sheets-Sheet 1

INVENTOR
MANFRED HANNI

INVENTOR
MANFRED HANNI

BY Shlesinger & Shlesinger ATTORNEYS

INVENTORS
MANFRED HANNI

BY *[signature]* ATTORNEYS

United States Patent Office 3,478,170

Patented Nov. 11, 1969

3,478,170
MODULATION SYSTEM FOR CONVERTING ANALOGUE SIGNALS TO A PULSE AMPLITUDE TO PULSE WIDTH TO A BINARY OUTPUT

Manfred Hanni, Munich, Germany, assignor to Siemens Aktiengesellschaft, Munich, Germany, a corporation of Germany Filed Oct. 22, 1965, Ser. No. 501,754
Int. Cl. H04b *1/02*
U.S. Cl. 179—15 7 Claims

ABSTRACT OF THE DISCLOSURE

A modulation and compandor circuit for transmitting and processing intelligence and comprising a switching means for converting an analog signal into a plurality of amplitude modulated pulses and a switching circuit receiving the amplitude modulated pulses to convert them into pulse length modulated pulses which circuit includes a charging circuit with variable time constant, a pulse generator keyed by the variable length pulses to emit the number of pulses corresponding to the length of the pulses, a binary counter receiving the output of the pulse generator and providing an output back to the amplitude to pulse length converter to vary the time constant of the charging circuit.

This invention relates to electric modulator and compandor circuit arrangements.

More particularly this invention relates to electric modulator and compandor circuit arrangements of the type, for use in telecommunications systems, including a sampling arrangement which samples the signals fed thereto, and a first pulse-modulator arrangement which converts the samples into a pulse-duration modulated signal. The pulse-modulator arrangement includes a charge transfer arrangement including a reservoir capacitor which is charged by each signal sample to the level of that sample, and which is discharged, linearly, in the time interval between two consecutive signal samples. The arrangement may include a second pulse-modulator arrangement following said first pulse-modulator arrangement.

In the transmission of signals by radio or in cables, frequent use is made of pulse-modulation techniques because they are substantially less prone to disturbances than normal amplitude modulation systems. They also make possible simple regeneration of the signals along the transmission path, especially in cases where during modulation quantisation is accomplished. To obtain pulse-duration, pulse-phase or pulse-code modulation, the continuous input signal to be transmitted is usually first converted into a pulse-amplitude modulated signal which is then fed to a pulse-modulator which converts the pulse-amplitude modulated signal into a pulse-duration modulated signal. From the latter, a pulse-phase modulated or a pulse-code modulated signal can be derived in a relatively simple manner. This may be done by an additional pulse-modulator. Since the subdivision of the amplitude of the signal to be transmitted into discrete sub-values (quantisation) which is necessary in pulse-code modulation, cannot be carried out with a high degree of accuracy at low cost, telecommunications systems operating with quantised pulse-modulation have intrinsic noise which depends on the degree of quantisation, the so-called "quantisation-noise." This quantisation noise can be kept at a sufficiently low level, even with relatively coarse quantisation, by choosing the sub-values as a function of the signal amplitude. Favourable results can be achieved when the subdivision is made substantially finer at small amplitudes than at high amplitudes.

The different weighting of various amplitude ranges is also often beneficial in the transmission of D.C. signals by means of quantised pulse-modulation techniques.

Arrangements for performing such functions are commonly called compandors. A compandor may be a circuit arrangement, constructed of differently biased diodes, which has an inflected characteristic curve, through which the signal to be companded is passed. High requirements of accuracy are required by such inflection-compandors, and difficulties are encountered in attempts to keep "cross-talk" at a sufficiently low level. In order to avoid these difficulties, in time-division multiplex systems, compandors common to several channels (group compandors) may be replaced by individual compandors respectively associated with the channels (individual compandors).

One object of the present invention is to provide an electric modulator and compandor circuit of the type specified in which the above-discussed disadvantages are overcome at least in part and which can be used simultaneously for a plurality of communication channels.

According to the present invention, there is provided an electric modulator and compandor circuit arrangement of the type specified including a counter, a start/stop generator which feeds said counter and which is controlled by said pulse-duration modulated signal, and a switching arrangement which is controlled by said counter, the arrangement being such that said switching arrangement is controlled so as to vary the discharge-time constant of said charge transfer arrangement in accordance with the desired companding ratio, at least at one position of said counter, which position is determined by the amplitude range to be companded.

Said switching arrangement may be controlled by said counter by way of a logic circuit arrangement.

The present invention is based on the observation that companding does not necessarily have to be applied to the signal to be modulated appearing at the input, and that companding by means of changing the time constant of the charge-transfer arrangement in the first pulse-modulator arrangement, which transforms the pulse-amplitude modulated signals into pulse-duration modulated signals, makes possible a circuit arrangement which is practically without influence on the cross-talk properties of the arrangement.

Said first pulse-modulator arrangement may include an electronic switch, which may be a transistor. In this arrangement said charge-transfer arrangement may include in addition to said reservoir capacitor, which is in series with the control input of said electronic switch, a switch which short-circuits the input of the pulse-modulator arrangement during the time interval between two consecutive signal samples. In addition at least two series-connected resistors are connected to said reservoir capacitor. One of these resistors is short circuited by a switch.

In a preferred arrangement in which said pulse-modulator arrangement is constructed as a pulse-code modulator by feeding the duration-modulated pulse signal to the input of a start/stop generator which, for the duration of each duration-modulated pulse, feeds an alternating voltage signal of preset frequency to a binary counter at the stage outputs of which, at the end of a counting process, the elements of the desired signal appear in parallel, said start/stop generator and said binary counter are arranged in said switching arrangement.

In order to effect a reliable operation of said binary counter, it is desirable to provide a further switching arrangement for controlling the counting process. The further switching arrangement is connected to said binary counter, through a logic circuit arrangement, in such a manner that it responds when the last counting position is reached, and then prevents further counting.

In order to recover the original signal as far as possible free from distortion after expansion at the receiver end of the communication path, the zero value of the signal voltage must coincide as precisely as possible temporally with a predetermined location on the compandor characteristic curve. In the transmission of alternating voltages for example, for which the characteristic curve of the compandor has two inflections, the zero value of the signal voltage should preferably be located in the center of the companding range. This can be achieved in a simple manner by means of an automatic regulator circuit comprising a regulating amplifier which is controlled in dependence upon the mean ratio of the number of times the last stage of said binary counter is in one of its positions to the number of times it is in the other of its positions over a given period of time. To this end, the input of the regulating amplifier is connected by way of a filter arrangement to one of the two outputs of the last counter stage. The regulating amplifier may for example drive a variable reactance diode which acts on the frequency of the start/stop generator.

In general, it is advantageous to feed the input signal to the sampling arrangement together with a unidirectional voltage signal superimposed thereon, the magnitude of which signal is selected to equal the maximum amplitude of the input signal. With such an arrangement it is expedient to effect the automatic zero-setting of the input signal by deriving said unidirectional voltage signal at least partly from said regulating amplifier.

One embodiment of an electric circuit arrangement in accordance with the present invention will now be described by way of example with reference to the accompanying drawings, in which.

Figure 1:
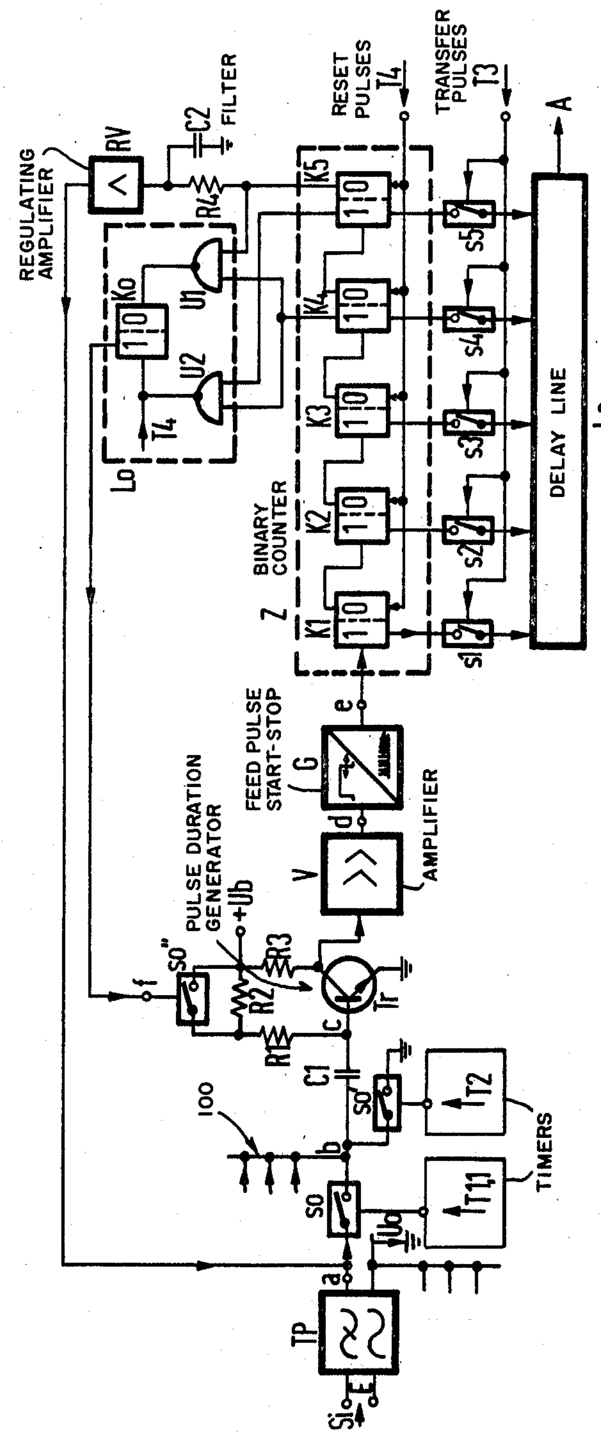
FIGURE 1 is a circuit diagram of the arrangement.

Referring now to FIGURE 1, the arrangements here shown is for the modulation of several channels (group modulator) in a time-division multiplex communications system. At the input side, the modulator has for each channel a lowpass filter TP, to the input E of which the modulating signal S*i* is supplied. Each lowpass filter TP is followed by a sampling arrangement which consists of electronic switches $s_0$. The number of lowpass filters coresponds to the number of channels combined in a group. The lowpass filters with their associated sampling arrangements are connected in parallel on the output side to the input of a following pulse-modulator arrangement. The lowpass filter TP shown in FIGURE 1 with its associated sampling arrangement constitutes the modulator input circuit for the channel 1. The modulator input circuits for the other channels 2 . . . *n* are merely indicated in FIGURE 1 by the leads 100 at the output of the switch $s_0$. Each switch $s_0$ is driven by a timer T1 (1 . . . *n* (not shown), i.e. the switch $s_0$ for the channel 1 by the timer T1.1 whose sequential frequency is at least twice as great as the highest frequency of the signal S*i*.

The pulse-modulator arangement, in which the signal samples of the individual channels are converted into a pulse-duration modulated signal, includes a transistor T*r*1, the base electrode of which is connected by way of two resistors R1 and R2 to a positive unidirectional voltage source U*b*, while its collector electrode is connected to U*b* by way of a resistor R3. The resistances R1 and R2 together with a capacitor C1 connected in series with the base electrode of the transistor T*r*1 and an electronic switch $s_0'$ located in front of the input of the modulator arrangement together form a charge transfer arrangement, by which the transistor T*r*1 is driven in the sense of the desired transformation of the input signal samples. The timer T2, controlling the switch $s_0'$ has a sequential frequency which is higher than that of the timer T1 (1 . . . n) by the number of channels combined into a group, and is such that the switch $s_0'$ is closed in the interval between two consecutive input signal samples.

An amplifier V follows the output of the transistor T*r*1 and amplifies the duration-modulated pulses and feeds them to the input of a start/stop generator G which, for the duration of a duration-modulated pulse, feeds a number of pulses proportional to the duration to the input of a binary counter Z, which has five stages K1 . . . K5. The counting result, which at the end of the counting process appears at the "One" outputs of the counting stages and represents the desired binary code in parallel-presentation of its elements, is fed through switches *s*1 . . . *s*5 controlled by a transfer pulse T3 to a delay line L*a*, at the output A of which the elements of the code signal appear in succession. After this, the counter Z is reset to zero by means of a resetting pulse T4, and thus made ready for the next counting process.

The start/stop generator G and the counter Z are included in a switching arrangement provided for the companding. To this end, the counter Z controls through the "One" output of its counter stage K4 and through the two outputs of its counter stage K5 a logic circuit consisting of two AND-gates U1 and U2 and a bistable flip-flop K*o*, which logic circuit in turn actuates through the "One" output of the bistable flip-flop K*o* the switch $s_0''$ which shorts the resistance R2.

For automatic regulation of the zero value of the input signal to the center of the companding range there is provided a regulating amplifier RV, the input of which is connected by way of a resistance R4 to the "Zero" output of the stage K5 of the binary counter Z. The resistance R4 constitutes, together with a capacitor C2 a filter arrangement through which only the temporal means value of the voltage appearing at the "Zero" output of the stage K5 is applied to the input of the regulating amplifier RV. The output of the regulating amplifier RV is connected to the output of the lowpass filters TP, so that a regulating unidirectional voltage signal is superimposed on the input signals to the sampling arrangements. The unidirectional voltage Uo at the output of the regulating amplifier RV equals the maximum rated amplitude of the input signals.

Figure 2:
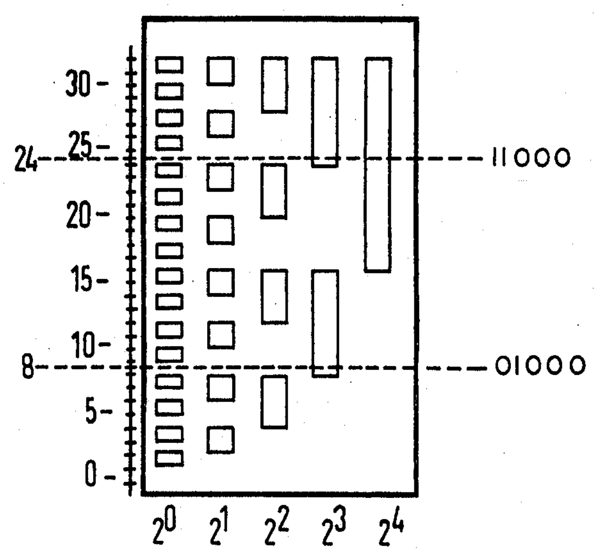
FIGURE 2 is a code pattern for the binary counter of the arrangement of FIGURE 1.
Figure 4:
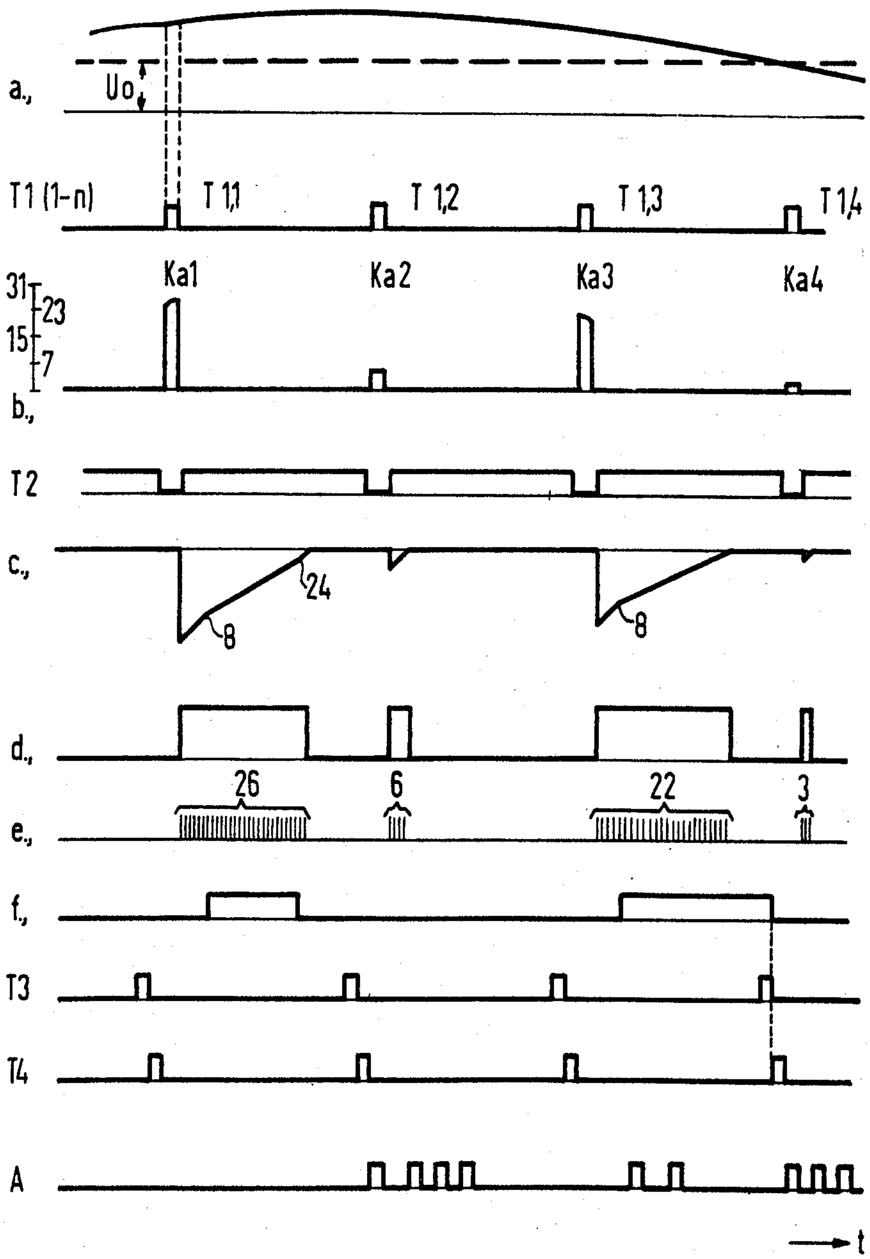
FIGURE 4 is a time diagram for the voltages appearing in the arrangement of FIGURE 1.

Referring now to FIGURES 2 and 4, FIGURE 2 shows a diagram of the five-digit binary code produced by the binary counter Z and FIGURE 4 shows a temporal representation of the voltages appearing in the arrangement of FIGURE 1. The individual diagrams are provided with references which also appear in FIGURE 1 and each of which designates the location at which the individual voltages become effective in relation to the reference voltage. FIGURE 2 illustrates the condition of the stages K1 through K5 of the binary counter Z. For example, as shown above, the column labeled $2^0$ the first stage K1 assumes a 1 or 0 condition on each of the input pulses. The blocks associated with column $2^0$, for example, indicate this in that a block exists on each odd number pulse. The blocks above the column $2^1$ illustrate the condition of the stage K2 of the binary counter, and it is to be noted that this is switched on only the zero outputs of stage K1. Thus, it is switched only half as often as stage K1. Stages K3, K4 and K5 are switched in a similar fashion by the outputs of the succeeding stage, so the binary counter Z comprises a standard form divider chain.

As already mentioned, companding is achieved in that in dependence upon the counting position of the binary counter Z the time constant of the charge transfer arrangement of the pulse-modulator arrangement, which converts the signal samples into a pulse-duration modulated signal is varied. In the arrangement of FIGURE 1 this is achieved by means of the switch $s_0''$, which in the rest position short-circuits the resistance R2, which resistance R2 constitutes a part of the discharge-resistance for the reservoir capacitor C1.

Let it be assumed that the compounding range is located within the limits of the stages 8 and 24. (FIGURE 2). This means, that the binary counter Z, which counts the pulses at the output of the start/stop generator G, in the counting position 00010 has to open the switch $s_0''$ through the logic circuit L*o* and has to close this switch again when, after further counting, the counter Z reaches the position 00011. This is achieved as follows:

If the stage K4 occupies the position "One" and the stage K5 occupies the position "Zero," then the AND-gate U1 feeds a pulse to the bistable flip-flop K*o* which causes it to fall into the "Zero" position and thus opens the switch $s_0''$. If now the stages K4 and K5 both reach the position "One," then the bistable flip-flop K*o* is switched back into the "One" position through the output of the AND–gate U2 and thereby the switch $s_0''$ is closed.

The uppermost diagram of FIGURE 4 represents the signal voltage of the first channel at the input of the sampling arrangement associated therewith, constituted by the switch $s_0$. Here, on the input signal a unidirectional voltage U*o* is superimposed, which is precisely of such magnitude that the negative value of the maximum amplitude of the input signal assumes the value "Zero." In other words, the unidirectional voltage U*o* marks the zero-line of the signal representing the input alternating voltage signal, and thus signal samples of only one polarity are fed to the pulse-modulator arrangement following the sampling arrangement. In order to indicate that the timer T1.1 controlling the sampling arrangement of the channel 1 is effective with a corresponding phase-shift on the sampling arrangements of the other channels, the second diagram of FIGURE 4 shows the pulse signals from the timers T1.1 . . . T1.4 for the first four channels.

The binary counter represents a total of 32 amplitude stages. In order to indicate these, a corresponding scaling rule is included in the diagram illustrating the signal samples K*a*1 . . . K*a*4 from the successive channels.

The signal samples succeeding each other in the pulse frame charge the reservoir capacitor C1 through the emitter-base circuit of the transistor T*r*1. The timer T2 closes the switch $s_0'$ during the time interval between two consecutive signal samples, so that in these time intervals the reservoir capacitor C1 is under reference potential. As soon as the switch $s_0'$ is closed, a negative voltage becomes effective at the base electrode of the transistor T*r*1, the value of which voltage equals the amplitude of the signal sample which has previously charged the reservoir capacitor C1. The transistor T*r*1 is thereby rendered non-conducting and a positive voltage appears at its collector electrode which, through the amplifier V, renders operative the start/stop generator G. Simultaneously, the binary counter Z begins to count the pulses appearing at the output of the start/stop generator G. The switch $s_0''$ is closed until the counting position 8 is reached. Thus, the discharge of the reservoir capacitor C1 takes place only through the resistance R1. On reaching the counting position "8," the switch $s_0''$ is opened, so that now the discharge of the capacitor C1 proceeds at a slower rate corresponding to the ratio of the resistance $R1+R2$ to the resistance R1. The triangular course of the voltage at the base electrode of the transistor T*r*1 thus receives a kick in the counting position "8" of the binary counter Z, the size of this kick being determined by the aforementioned ratio. The delayed discharge signifies that the weighting of the input signal in the region about its zero-line is better than the region of its negative maximum value. The same applies for the region of its positive maximum, since the discharge will again be accelerated by the opening of the switch $s_0''$, as soon as the counter has reached the counting position "24."

When the discharge of the capacitor C1 is finished the transistor T*r*1 becomes conducting and terminates the duration-modulated pulse of the input of the start/stop generator G, which thereby falls into the rest state.

The signal sample K*a*3 in diagram *b* has an amplitude of 22 stages. Accordingly, the discharge process of the reservaic capacitor C1 is already finished before the counter Z reaches the counting position 24 and thus closes, through the logic circuit L*o*, the switch $s_0''$ (diagram *f*). However, this switch $s_0''$ must again be closed at the commencement of a new discharge of the reservoir capacitor C1. This is effected by the resetting pulse T4 which immediately succeeds the transfer pulse T3. These circumstances are indicated in FIGURE 1 by the arrow referenced T4 at the "One" input of the bistable flip-flop K*o*.

The last diagram of FIGURE 4 illustrates the code signals appearing at the output A of the delay line L*a*.

In the arrangement of FIGURE 1, a companador characteristic curve with two curves symmetrical in relation to the zero value has been assumed. It is of course possible to achieve in arrangements in accordance with the present invention compandor characteristic curves with more than two inflections in any position, by suitable constructing the logic circuit and the switching arrangement.

For the automatic regulation of the coincidence of the zero-position of the input signal with the centre of the companding range, use is made of the observation that with correct adjustment, the last stage of the binary counter Z must, on the average, assume the "Zero" position the same number of times as it assumes the "One" position. If, on the average, the "One" position occurs more frequently than the "Zero" position, then the alteration hereby cause of the mean value of the voltage appearing on the outputs of the last counter stage can be exploited in the already described simple manner for regulating the unidirectional voltage signal superimposed on the input signal at the input of the sampling arrangement.

Instead of a regulation of the unidirectional voltage U*o* the output signal from the regulating amplifier RV may be employed for controlling the frequency of the start/stop generator G.

Figure 3:
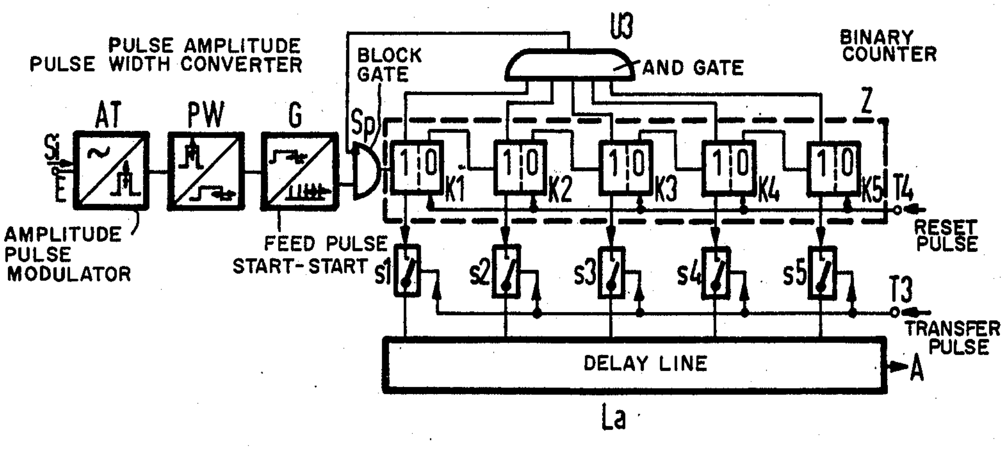
FIGURE 3 is a limiter circuit suitable for use in the arrangement of FIGURE 1.

The aforesaid described automatic regulation arrangement presupposes that the binary counter Z is fully exploited up to its last counting stage. This in turn necessitates a limiting circuit which, by reliably ensuring the stopping of the counter at its last counting stage, makes possible the full exploitation thereof. A limiting circuit of this kind is shown in FIGURE 3. For the sake of clarity, the companding arrangement and the automatic regulation arrangement have not been included in this figure.

The limiting circuit consists of a blocking gate S*p* and an AND-gate U3. The blocking gate S*p* is connected in between the output of the start/stop generator G and the input of the binary counter Z, and its blocking input is connected to the output of the AND-gate U3. The AND-gate U3 has a number of inputs corresponding to the number of stages of the counter Z, each of which input is connected with the "One" input of a counter stage. As soon as the counter reaches its last counting stage, all stages thus being in the "One" position, the blocking gate S*p* is blocked through the output of the AND-gate U3 and the counting process is stopped.

What I claim is:

1. An electronic modulator and compandor circuit comprising an input terminal receiving an analog signal, a first switching means in series with the input terminal and switched at a rate which is at least twice as high as the highest frequency of signal components in the input signal, a charging circuit comprising a capacitor and a pair of resistors connected to said first switching means, a second switching means connected to the capacitor to discharge it and switched at a rate higher than the first switching means, a third switching means connected across one of the pair of resistors to periodically short it out to change the time constant of said charging circuit, a start-stop generator coupled to the charging circuit, a binary counter connected to the start-stop generator and comprising a plurality of binary stages, said binary counter converting the output of said start-stop generator to a binary signal indicative of the modulation contained in said analog signal, and a logic circuit connected to at least one of said binary stages and connected to said third switching means to periodically short out said one resistor.

2. Apparatus according to claim 1 wherein said logic circuit is connected to at least two of said binary stages.

3. Apparatus according to claim 2 comprising a plurality of input signals connected to said charging circuit, and the switching rate of the second switching means controlled as a function of the number of input signals.

4. Apparatus according to claim 3 comprising an electronic switching means connected to said charging circuit and connected to gate the pulse start-stop generator.

5. Apparatus according to claim 4 wherein said electronic switching means comprises a transistor.

6. An electronic modulating circuit comprising an input terminal receiving an analog signal, means for converting said analog signal to a series of amplitude modulated pulses, means for converting said series of amplitude modulated pulses into a series of pulse width modulated pulses, a pulse generator controlled by said pulse width modulated pulses to produce a number of pulses with the number proportional to the pulse widths, a binary counter connected to the output of the pulse generator to convert the pulses to a binary output, a logic circuit connected to said counter and to said means for converting said pulses into pulse width modulated pulses, said logic circuit comprising a filter connected to said binary counter and a regulating amplifier receiving the output at said filter, the output of said regulating amplifier connected to said input terminal, said circuit also including a divider with its output connected to said means for converting said analogue signals.

7. Apparatus according to claim 6 wherein said means for converting pulses into pulse width modulated pulses includes a capacitor and a pair of resistors, a switch connected across one of said resistors, and the logic circuit connected to said switch.

References Cited

UNITED STATES PATENTS

| | | | |
|---|---|---|---|
| 2,695,927 | 11/1954 | Caruthers et al. | 179—15 |
| 2,889,409 | 6/1959 | Carbrey | 179—15.6 |
| 2,996,704 | 8/1961 | Dimond et al. | 340—353 |
| 3,277,395 | 10/1966 | Grindle et al. | 332—9 |
| 3,281,806 | 10/1966 | Lawrence et al. | 340—174.1 |
| 2,430,139 | 11/1947 | Peterson | 179—15 |
| 2,774,957 | 12/1956 | Towner | 340—205 |
| 3,017,626 | 1/1962 | Muller | 340—347 |
| 3,201,777 | 8/1965 | Brown | 332—11 |
| 2,252,293 | 8/1941 | Ohl | 325—143 |

FOREIGN PATENTS 628,555 6/1946 England.

ROBERT L. GRIFFIN, Primary Examiner

C. R. VONHELLENS, Assistant Examiner

U.S. Cl. X.R.

325—38, 142; 332—9